INVENTOR
Sten Soderberg
BY
Pennie Davis Marvin + Edmonds
ATTORNEYS

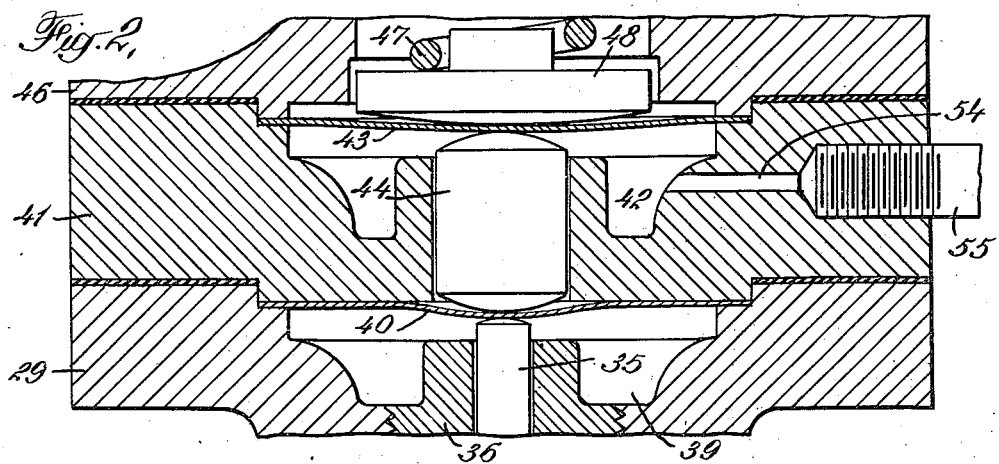
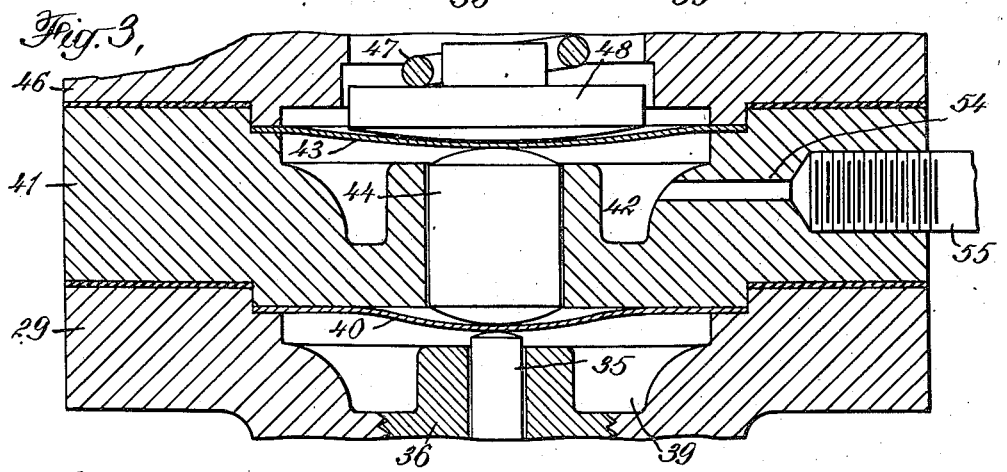
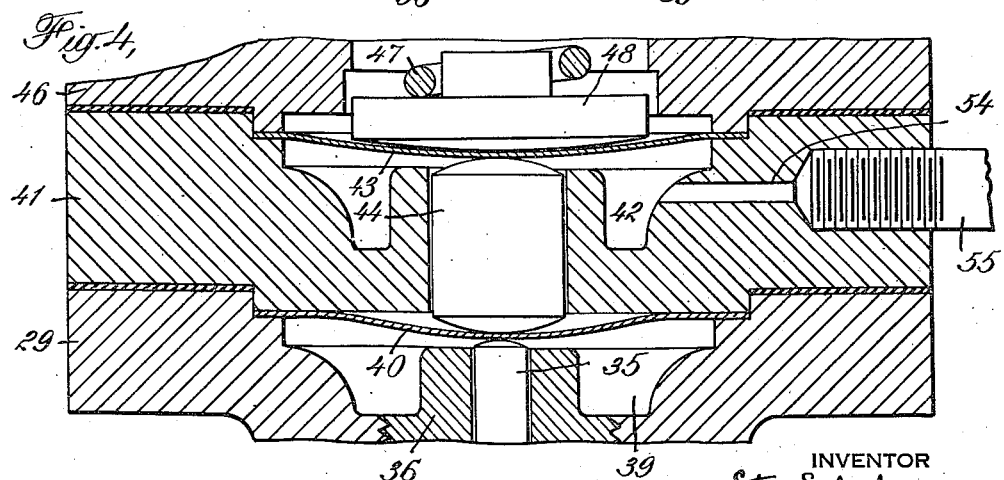

UNITED STATES PATENT OFFICE 2,277,162

PRESSURE REGULATOR

Sten Soderberg, Passaic, N. J., assignor to Leslie Company, Lyndhurst, N. J., a corporation of New Jersey Application December 17, 1940, Serial No. 370,487

7 Claims. (Cl. 50—11)

This invention relates to pressure regulators and more particularly to a pressure regulator of novel construction in which the tendency to over-regulate or "hunt" is greatly reduced or eliminated. The new regulator is of relatively simple construction, is sensitive in operation, and is adapted to function accurately over a wide range of pressures.

Pressure regulators as commonly made comprise a valve operated by a diaphragm (or piston) subjected on one side to the fluid pressure to be regulated. Generally, this valve is arranged to act as a pilot valve and control, in turn, a main valve which regulates the flow of fluid so as to maintain a predetermined pressure in the outlet of the regulator or in an apparatus such as a pump, etc., operated by the outlet pressure. In operation, the outlet or regulated pressure is communicated to the diaphragm for the pilot valve and acts through this valve to control the supply of fluid at a relatively high pressure to one side of another diaphragm (or piston) connected to the main valve. Accordingly, whenever the regulated pressure becomes too high or too low, it causes the pilot valve to change the pressure on the diaphragm for the main valve so that the latter is adjusted to restore the desired outlet pressure.

One of the principal objections to this type of regulator is that it tends to over-regulate or hunt. That is, a sudden change in the controlled outlet pressure due to an external cause results in a greater movement of the pilot valve than is necessary to compensate for this pressure change, so that the main valve moves too far under control of the pilot valve and unbalances the outlet pressure in the opposite direction. This action may continue for a considerable period of time before the regulator is stabilized, and the reason for it is that the pressure impulse caused by a repositioning of the main valve is not transmitted immediately to the pilot diaphragm. Various means have been devised heretofore for reducing this hunting effect but, so far as I am aware, they are not sufficiently effective or they involve relatively intricate and expensive constructions.

The present invention, therefore, is directed to the provision of a novel pressure regulator which effectively reduces or eliminates the tendency to hunt and, in addition, is of relatively simple construction and is sensitive and accurate in operation. A regulator made in accordance with my invention comprises a regulating valve operatively connected to a pressure responsive means which is influenced by the fluid pressure to be regulated, the pressure responsive means including a diaphragm or other pressure element subjected on one side to a relatively high fluid pressure and on the opposite side to a relatively low fluid pressure. The regulator is characterized in that it includes a means for progressively decreasing the effective pressure area of the diaphragm as it moves in the direction in which it is urged by the relatively high fluid pressure, and for progressively increasing its effective pressure area as it moves in the opposite direction. Preferably, the regulating valve is arranged to operate as a pilot for a main valve which controls the flow of fluid through the regulator to maintain the desired outlet pressure, although it will be understood that the regulating valve could be used to control the outlet pressure directly.

With this construction, when the regulated pressure becomes too high or too low it acts through the pressure responsive means for the regulating valve to cause the latter to counteract the pressure change either directly or through the main valve. However, when the change in the regulated pressure causes the pressure responsive means to move in the direction in which it is urged by the relatively high pressure acting on the diaphragm, the resulting decrease in the effective area of the diaphragm progressively decreases the force moving the pressure responsive means in this direction, so that the latter assumes a balanced condition more quickly and the movement of the regulating valve is reduced. Conversely, when the pressure responsive means moves in the opposite direction due to a change in the regulated pressure, the resulting increase in the effective area of the diaphragm progressively increases the force opposing the movement so that the pressure responsive means is balanced and the movement of the valve is arrested more quickly. Thus, the movements of the pressure responsive means are effectively dampened and the tendency to hunt is greatly reduced or eliminated.

For a better understanding of the invention reference may be had to the accompanying drawings, in which:

Figs. 2, 3 and 4 are enlarged sectional views in elevation showing different positions of the pressure responsive means illustrated in Fig. 1.

Figure 1:
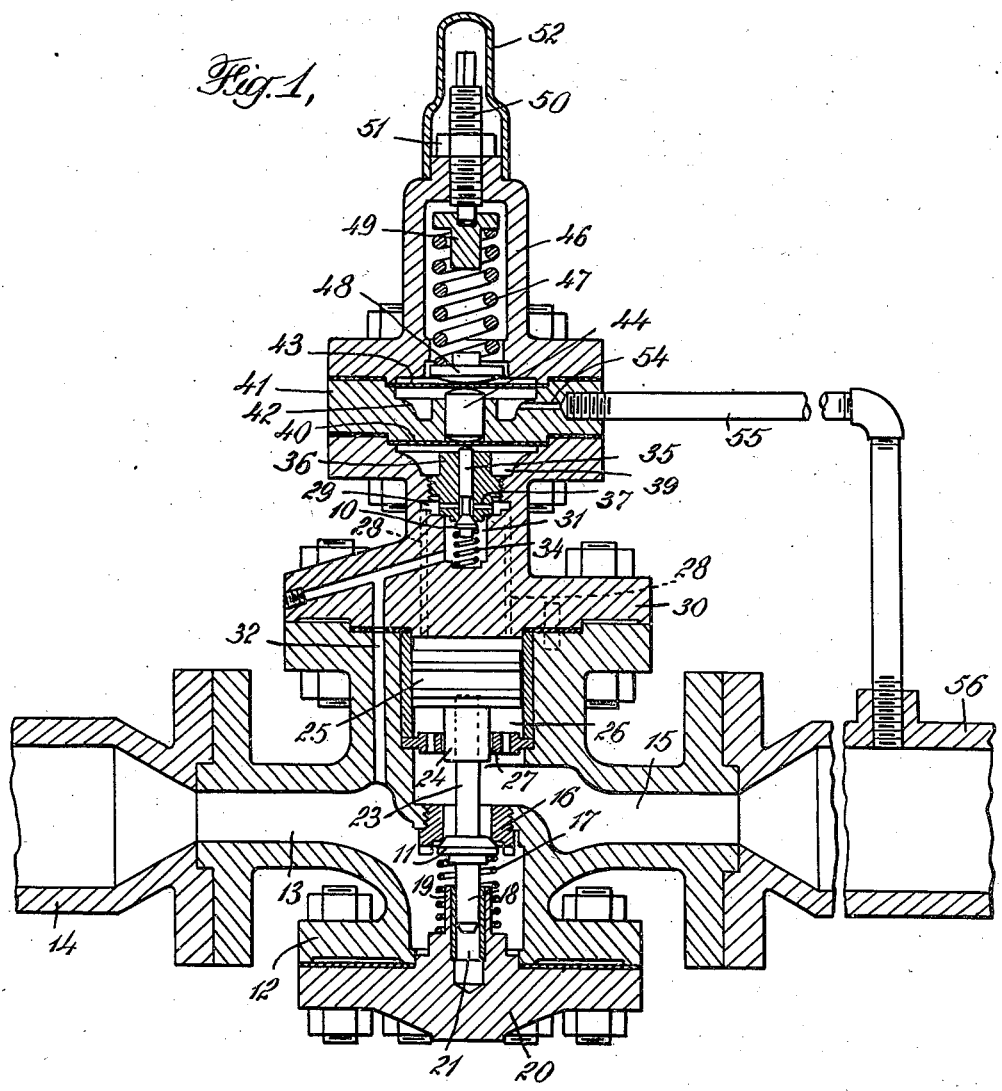
Fig. 1 is a sectional view in elevation of one form of the new regulator.

Referring to the drawings, the pressure regulator there shown is of the type comprising a regulating valve 10 arranged to operate as a pilot control for a main valve 11. The regulator comprises a casing 12 having an inlet 13 through which fluid is supplied at relatively high pressure from a pipe 14, and an outlet 15 from which the fluid is delivered at a relatively low pressure. The flow of fluid through thte regulator is controlled by the main valve 11 which cooperates with a valve seat 16 threaded in a partition between the inlet and the outlet. A compression spring 17 urges the main valve toward its seat 16 and is coiled around a guide rod 18 on the valve and around a hollow boss 19 projecting upwardly from a plate 20 secured to the bottom of the casing. The guide rod is slidable in the boss 19 and in a bore 21 communicating therewith in the bottom plate 20.

Extending upwardly from the main valve 11 is a valve stem 23 fitted loosely in a hollow boss 24 on a pressure responsive means, such as a piston 25 movable in a cylinder 26. The cylinder at its lower end communicates with the outlet 15 through a perforated partition 27 through which the boss 24 extends loosely. At its upper end, the cylinder communicates through ducts 28 with an annular space 29 formed in a sub-section 30 of the casing. The space 29 is connected through the regulating or pilot valve 10 with a chamber 31 which, in turn, is connected by a duct 32 to the inlet 13 of the main valve.

The pilot valve 10 is urged toward its seat by a compression spring 34 and has a stem 35 extending upwardly through a central passage in a member 36 threaded in the upper end of the sub-section 30, the member 36 being formed with radial ducts 37 connecting the central passage with the annular space 29. The stem 35 fits loosely in the member 36 and is provided with a reduced portion extending upwardly from the pilot valve a substantial distance above the radial ducts 37, thereby permitting free passage of fluid from chamber 31 to the cylinder 26 when the pilot valve opens.

At its upper end, the passage in the threaded member 36 opens into a recess 39 in the top of the casing subsection 30, the recess 39 being closed at the top of the subsection by a diaphragm 40. Preferably, the diaphragm is made of thin metal and is clamped in position by a partition 41 secured to the top of the sub-section. The lower surface of the diaphragm is engaged by the upper end of valve stem 35, and the parts are so proportioned that when the pilot valve 10 is seated the diaphragm lies flat against the lower face of partition 41, as shown in Fig. 1. In the central portion of the partition is a vertical passage considerably smaller in cross sectional area than the underlying recess 39, and this passage opens at the top into a second recess 42 formed in the partition. The recess 42 is closed at the top of the partition by a second diaphragm 43, the two diaphragms being operatively connected by a plunger 44 extending loosely through the central passage in the partition.

The diaphragm 43 is clamped to the partition 41 by another sub-section 46 of the casing. The sub-section 46 is hollow and contains a compression spring 47 seated at its lower end on a button 48 engaging the diaphragm 43, the upper end of the spring being seated against a guide member 49 engaged by an adjustment screw 50 threaded in the top of sub-section 46. The adjustment screw may be locked in its adjusted position by a lock nut 51 and is preferably housed in a removable cap 52 secured to the top of the casing.

The recess 42 intermediate the diaphragms is supplied with fluid at the regulated pressure, and to this end it may be connected through a duct 54 to a conduit 55 which may lead directly to the outlet 15 or, as shown, to a pipe 56 which, in turn, is connected to the outlet, as, for example, through a turbine (not shown) driven by the outlet pressure and a pump (not shown) driven by the turbine, in which case the regulator responds to pressure at the outlet side of the pump.

In operation, the adjustment member 50 is screwed into the casing to depress the diaphragm 43 through spring 47, thereby forcing the central portion of diaphragm 40 away from partition 41 and unseating the pilot valve against the action of spring 34. As a result, fluid passes from the inlet 13 through duct 32, chamber 31 and ducts 37 and 28 to the top of cylinder 26. The piston is thus subjected to an increased pressure which urges it downwardly against the spring 17 and opens the main valve to permit the passage of fluid from the inlet 13 to the outlet 15. As the pressure in the pipe 56 increases, the pressure in recess 42 likewise increases and acts to shut down the pilot valve 10. That is, while the pressure in recess 42 is communicated through the central passage in partition 41 to the top of diaphragm 40 and acts on the underlying effective area of this diaphragm to open the pilot valve, it also acts on the upper diaphragm 43 to close the pilot valve, and since the upper diaphragm is considerably larger in effective area than the lower diaphragm even when the central portion of the latter is moved away from the partition the maximum amount to provide the maximum effective area, as shown in Fig. 4, the net effect of a pressure increase in recess 42 is to shut down the regulating valve. As a result, the supply of fluid from the inlet 13 to the top of piston 25 is reduced so that the fluid pressure on the piston decreases and allows spring 17 to throttle the main valve 11, whereby the rate of flow through the main valve is reduced to the point where the desired pressure is maintained in the pipe 56. Thereafter, if the regulated pressure in pipe 56 should decrease for any reason, the resulting reduction of pressure in recess 42 causes the pilot valve to open wider and thereby increase the pressure on top of piston 25 which then opens the main valve wider and restores the pressure. Conversely, if the regulated pressure in pipe 56 becomes too high, the increased pressure in recess 42 acts to shut down the pilot valve and the main valve, as previously described.

It will be observed that in the operation of the pilot regulating valve 10 the effective pressure area of the lower diaphragm 40 increases progressively as the pilot valve opens in response to a decrease in the regulated pressure in recess 42. More particularly, as the upper diaphragm 43 moves downwardly due to a drop in the regulated pressure, the central portion of the lower diaphragm 40 is moved progressively away from the partition 41 by plunger 44 with the result that an additional area of this diaphragm is subjected to the pressures on its opposite sides and therefore becomes effective to oppose this downward movement by the action thereon of the higher pressure in recess 39 which is communicated from the pilot valve along the stem 35. On the other hand, when the diaphragms and the pilot valve move upwardly in response to a pressure increase in recess 42, the central portion of diaphragm 40 progressively engages the partition 42 around the opening therein so that the area of this diaphragm influenced by the pressures in recesses 39 and 42 decreases. In other words, in the operation of the pressure responsive means 40 and 43, the effective pressure area of the lower diaphragm 40 may vary between the relatively small area directly underlying the central passage in partition 41, as when the pilot valve is closed, and the relatively large area of the part of this diaphragm disengaged from the partition when the pilot valve is opened the maximum amount, as shown in Fig. 4.

These changes in the effective pressure area of diaphragm 40 oppose the tendency for the regulator to hunt. For example, when a sudden drop in the regulated pressure causes the pilot valve 10 to open, the effective pressure area of diaphragm 40 is increased an amount proportional to the downward movement of the valve and the diaphragms, and since the pressure on the lower face of diaphragm 40 acting to close the valve is greater than that on its upper face acting to open the valve, this increase in the effective area of diaphragm 40 correspondingly increases the force opposing the downward movement. Accordingly, the opening movement of the pilot valve is arrested more quickly than would otherwise be the case, and the reaction of the main valve to the pressure change is dampened. Conversely, when a sudden increase in the regulated pressure causes the pilot valve and the diaphragms to move upwardly, the resulting decrease in the effective pressure area of diaphragm 40 reduces the net force producing this movement so that the movement is arrested more quickly and the reaction of the main valve is not as great. Because of this gradually increasing opposition to the movements resulting from a change in the regulated pressure, the diaphragms assume a balanced condition more rapidly and the tendency for the regulator to hunt is greatly reduced or eliminated.

In my new regulator, the tendency to hunt is further reduced by variations in the intermediate pressure in recess 39. More particularly, when the pilot valve 10 is opened suddenly in response to a drop in the regulated pressure, the resulting increase in the pressure at the outlet side of the pilot valve is communicated along the stem 35 to the recess 39 and further increases the force opposing the opening of this valve. On the other hand, when the pilot valve is shut down suddenly in response to an increase in the regulated pressure, the resulting drop in the pressure in recess 39 decreases the net force acting through diaphragm 40 to close the valve.

It will be apparent from the foregoing that not only does a variation in the regulated pressure in pipe 56 and recess 42 result in a progressively increasing force opposing the movement of the pilot valve which results from this variation, but the opposing force changes in proportion to the amplitude of the variation in the regulated pressure. Moreover, by reason of the variations in the free effective area of diaphragm 40, this opposing force is substantially uniform regardless of the outlet pressure for whoch the regulator is set, that is, regardless of whether adjustment member 50 is screwed down for a high regulated pressure or backed off for a low regulated pressure. For example, as shown in Fig. 2, the effective area of diaphragm 40 is relatively small at low-set pressures when the differential of the pressures on the opposite sides of diaphragm 40 is high, whereas the effective area of this diaphragm is relatively large at high-set pressures when the differential of the pressures on this diaphragm is low.

Figure 5:
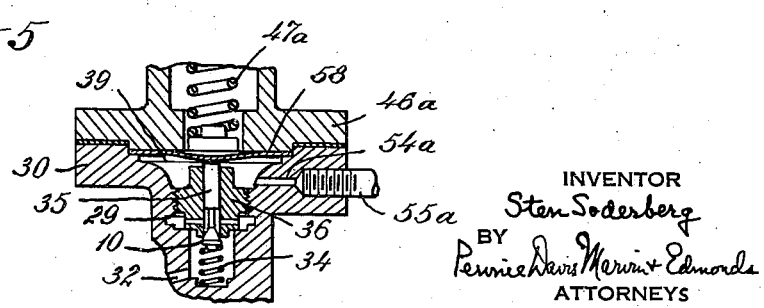
Fig. 5 is a sectional view in elevation of a modification of the regulator shown in Fig. 1.

The construction shown in Fig. 1 is preferred because the diaphragm 40 serves both as an "anti-hunting" means, in conjunction with the partition 41 which varies the effective area of the diaphragm as it moves, and as a means for preventing the escape of fluid from the pilot valve at intermediate pressure into the low pressure line 55. If desired, however, the modified construction shown in Fig. 5 may be employed. As there shown, a single diaphragm 58 is substituted for the two diaphragms 40 and 43 and is mounted directly above the recess 39 in the casing sub-section 29, the stem 35 preferably having a close fit in the member 36 to prevent any substantial leakage from the outlet side of the pilot valve into recess 39. The diaphragm 58 is clamped in position by the casing sub-section 46a containing the adjustable spring 47a which urges the diaphragm and the pilot valve downwardly against the action of spring 34. The opening in the sub-section 46a directly above the diaphragm has a cross sectional area considerably smaller than that of the recess 39 so that when the pilot valve is seated the diaphragm is backed over its upper surface except for the opening directly above it. With this construction, when the diaphragm and the pilot valve move downwardly due to a drop in the regulated pressure in recess 39, the diaphragm moves away from the lower surface of sub-section 46a and progressively increases in effective area, whereas upward movement of the pilot valve and diaphragm due to an increase in the regulated pressure causes a larger area of the diaphragm to engage the lower surface of sub-section 46a, whereby the effective area of this diaphragm is progressively decreased. These changes in effective area oppose the tendency for the regulator to hunt, as will be readily apparent from the preceding description in connection with Fig. 1.

I claim:

1. In a pressure regulator, a regulating valve, a pair of pressure responsive elements operatively connected to the valve, each of said elements being subjected on its opposite sides to relatively variable fluid pressures and one of the elements being subjected on one side to a relatively high fluid pressure, and means for gradually decreasing the effective pressure area of said last element as it moves in the direction in which it is urged by said relatively high fluid pressure.

2. In a pressure regulator, a regulating valve, a pair of pressure responsive elements operatively connected to the valve and partly defining a chamber between the elements containing a variable pressure fluid acting on the adjacent sides of the elements, one of said elements being subjected on its side remote from said chamber to a fluid pressure lower than said variable pressure and the other element being subjected on its side remote from said chamber to a fluid pressure higher than said variable pressure, and means for gradually decreasing the effective pressure area of said last element as it moves in the direction in which it is urged by said higher pressure fluid.

3. In a pressure regulator, a regulating valve, a pair of pressure responsive elements operatively connected to the valve and partly defining a chamber between the elements containing a variable pressure fluid acting on the adjacent sides of the elements, one of said elements being subjected on its side remote from said chamber to a fluid pressure lower than said variable pressure and acting to open the valve, the other element being subjected on its side remote from the chamber to a fluid pressure higher than said variable pressure and acting to close the valve, a spring acting on said elements to open the valve and adjustable to vary the normal position of the valve, and means for gradually decreasing the effective pressure area of said last pressure responsive element as the valve closes.

4. In a pressure regulator, a main valve having a high pressure inlet and a low pressure outlet, pressure responsive means for operating the valve to control the flow of fluid from the inlet to the outlet, a pilot valve for supplying fluid at an intermediate pressure on one side of said pressure responsive means, a second pressure responsive means for operating the pilot valve and subjected to a relatively low pressure to be regulated, a diaphragm operatively connected to said last means and subjected on one side to said intermediate pressure, and means for gradually varying the effective area of the diaphragm subjected to said intermediate pressure in accordance with the movement of said second pressure responsive means.

5. In a pressure regulator, a casing, a regulating valve therein for supplying fluid at a relatively high pressure, pressure responsive means in the casing operatively connected to the valve, a diaphragm in the casing operatively connected to the valve, a partition between the diaphragm and said means and at least partly defining with said means a chamber containing fluid at a relatively low pressure to be regulated, the casing defining with said diaphragm a second chamber on the side of the diaphragm remote from the first chamber and communicating with the outlet side of the valve, and a plunger extending through an opening in the partition between the diaphragm and the pressure responsive means, the diaphragm engaging the adjacent face of the partition around said opening and increasing gradually in effective area as it moves away from the partition.

6. In a pressure regulator, a regulating valve, a pair of pressure responsive elements operatively connected to the valve, one of said elements being subjected to a variable fluid pressure to be controlled and operable to move the valve in accordance with variations in said fluid pressure, the other element being subjected on one side to a fluid pressure and disposed in opposing relation to the first element whereby said last fluid pressure acts on said second element to oppose movement of the valve by the first element in response to a change in the fluid pressure to be controlled, and means for gradually decreasing the effective pressure area of said second element when it is moved in the direction in which it is urged by said second fluid pressure, the second element being operable by the variations in its effective area to oppose the tendency for the valve to hunt.

7. In a pressure regulator, a regulating valve, a pair of pressure responsive elements operatively connected to the valve, one of said elements being subjected to a variable fluid pressure to be controlled and operable to move the valve in accordance with variations in said fluid pressure, the other element being subjected on one side to a fluid pressure and disposed in opposing relation to the first element whereby said last fluid pressure acts on said second element to oppose movement of the valve by the first element in response to a change in the fluid pressure to be controlled, and means for gradually increasing the effective pressure area of the second element when it is moved by the first element against said second fluid pressure, the second element being operable by the variations in its effective area to oppose the tendency for the valve to hunt.

STEN SODERBERG.